United States Patent [19]

Shikakura

[11] Patent Number: 5,614,958
[45] Date of Patent: Mar. 25, 1997

[54] IMAGE PROCESSING APPARATUS WHICH CONCEALS IMAGE DATA IN ACCORDANCE WITH MOTION DATA

[75] Inventor: Akihiro Shikakura, Kawasaki, Japan

[73] Assignee: Canon Kabushiki Kaisha, Tokyo, Japan

[21] Appl. No.: 296,162

[22] Filed: Aug. 29, 1994

[30] Foreign Application Priority Data

Sep. 7, 1993 [JP] Japan .................................. 5-246447

[51] Int. Cl.⁶ ...................................................... H04N 7/68
[52] U.S. Cl. .......................... 348/616; 348/402; 348/407; 348/416; 348/466; 386/47
[58] Field of Search ................................. 348/616, 466, 348/407, 401, 402, 416; 358/336; H04N 7/68

[56] References Cited

U.S. PATENT DOCUMENTS 4,807,033  2/1989  Keeson ..................................... 348/407

FOREIGN PATENT DOCUMENTS

| 0415699 | 3/1991 | European Pat. Off. ......... H04N 5/94 |
| 0471580 | 2/1992 | European Pat. Off. ......... H04N 5/92 |
| 0521529 | 1/1993 | European Pat. Off. ......... H04N 7/13 |
| WO8702210 | 4/1987 | WIPO ............................ H04N 7/133 |
| WO93096636 | 5/1993 | WIPO .............................. H04N 7/13 |

OTHER PUBLICATIONS

ATM Transport and Cell–Loss Concealment Techniques For MPEG Video, D. Raychaudhuri, H. Sun, R.S. Girons, pp. I-117-120.

Primary Examiner—Howard W. Britton
Attorney, Agent, or Firm—Fitzpatrick, Cella, Harper & Scinto

[57] ABSTRACT

An image processing apparatus which conceals image data in accordance with motion data includes an input unit for inputting information data including motion data and image data encoded in accordance with the motion data, a detection unit for detecting error codes in the image data, and a concealment unit for concealing the image data by replacing it by image data of an adjacent picture frame extracted using the motion data.

20 Claims, 4 Drawing Sheets

5,614,958

IMAGE PROCESSING APPARATUS WHICH CONCEALS IMAGE DATA IN ACCORDANCE WITH MOTION DATA

BACKGROUND OF THE INVENTION

1. Field of the Invention

This invention relates to an image processing apparatus, and more particularly, to an image processing apparatus for decoding encoded data subjected to motion-compensation predictive encoding.

2. Description of the Related Art

Recently, in the field of digital transmission of moving images, high-efficiency encoding techniques have been intensively studied, and "image-encoding/decoding apparatuses using motion-compensation predictive encoding", in which excellent image transmission can be performed even at low data rates, have been realized.

In such an apparatus, a digitized image signal is first subjected to high-efficiency encoding at the transmission side for performing encoding, so that the amount of information is compressed and reduced.

Motion-compensation predictive encoding is adopted as the encoding method for the apparatus in order to improve the encoding efficiency. Motion information, including motion vectors, and encoded data are obtained in this processing.

The motion information and the encoded data are subjected to error correction encoding by adding parity bits thereto, and are transmitted to the reception side for performing decoding via a transmission channel. At the reception side, error correction for codes having the parity bits is performed for the received data string, and the resultant data is input to a high-efficiency decoding circuit.

The high-efficiency decoding circuit expands the amount of information of the received data in order to return the data to the original digital image signal, which is converted into an analog image signal, and the analog image signal is output.

When all errors produced in the transmission channel cannot be completely corrected by error correction processing at the reception side, the above-described high-efficiency decoding circuit cannot exactly decode image data if an uncorrectable error is present in either the motion information or the encoded data. In such a case, degradation in the reproduced image is minimized by replacing the corresponding image data by corrected data (which may comprise concealed data from another frame) and outputting the concealed data. More specifically, the image data is concealed, for example, by being replaced by image data in the immediately preceding field or frame.

However, in the conventional method of decoding image data at the reception side of the above-described high-efficiency encoding/decoding apparatus, even if an uncorrectable error is produced only in encoded data, all data including motion information, in which no uncorrectable error is present, are abandoned, so that a concealed portion becomes, in some cases, more pronounced in a moving portion in the image, thereby degrading the quality of the reproduced image.

SUMMARY OF THE INVENTION

The present invention has been made in consideration of the above-described problems.

It is an object of the present invention to provide an image processing apparatus, in which a reproduced image can be generated while minimizing degradation in the quality of the image, even if an uncorrectable error is produced in image data subjected to predictive encoding.

According to one aspect, the present invention, which achieves the above-described object, relates to an image processing apparatus comprising input means for inputting information data including motion data and image data encoded in accordance with the motion data, detection means for detecting error codes in the image data, and concealment means for concealing the image data by replacing it by image data of an adjacent picture frame extracted using the motion data.

According to another aspect, the present invention relates to an image processing apparatus comprising input means for inputting information data including motion data and image data encoded in accordance with the motion data, predictive image generation means for generating predictive image data based on the motion data, synthesis means for synthesizing the predictive image data with the image data, detection means for detecting error codes in the image data, and replacement means for replacing the image data input to the synthesis means by a predetermined value in accordance with an output from the detection means.

According to still another aspect, the present invention relates to an image processing apparatus comprising input means for inputting information data including motion data and image data encoded in accordance with the motion data, detection means for detecting error codes in the motion data and the encoded data, and decoding means for decoding the image data in accordance with an output from the detection means.

The foregoing and other objects, advantages and features of the present invention will become more apparent from the following detailed description of the preferred embodiments taken in conjunction with the accompanying drawings.

DETAILED DESCRIPTION OF THE PREFERRED EMBODIMENTS

A first embodiment of the present invention will now be described in detail with reference to the drawings.

Figure 1:
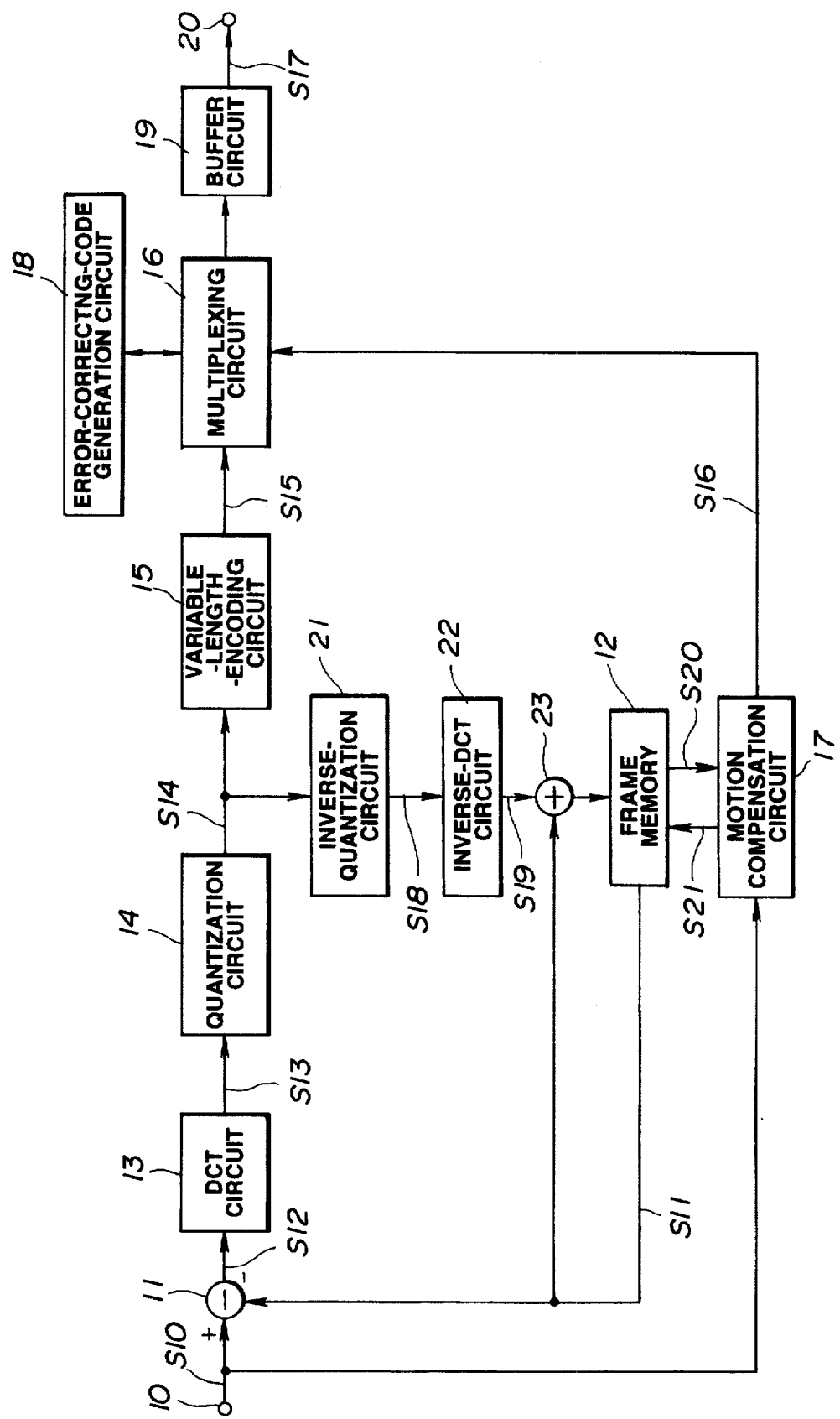
FIG. 1 is a block diagram of an image encoding apparatus according to a first embodiment of the present invention.

FIG. 1 is a block diagram of a motion-compensation predictive encoding apparatus of the first embodiment.

In FIG. 1, digital image data S10 is input from an input terminal 10. The digital image data S10 comprises data in units of a block comprising (8×8) pixels (picture elements).

The digital image data S10, and predictive data S11, which comprises image data of the immediately preceding frame stored in a frame memory 12, are input to a differential circuit 11. The method of generating the predictive data S11 will be described later.

The differential circuit 11 generates difference data S12 by obtaining the difference between the digital image data S10 and the predictive data S11, and outputs the difference data S12 to a DCT (discrete cosine transform) circuit 13. The DCT circuit 13 performs DCT of the difference data S12 in units of a block comprising (8×8) pixels by utilizing two-dimensional correlation between images, and outputs converted data S13 obtained as a result of the DCT to a quantization circuit 14. The quantization circuit 14 quantizes the converted data S13 with a predetermined quantization step, and outputs quantized data S14 obtained as a result of quantization to a variable-length-encoding circuit 15. The variable-length-encoding circuit 15 outputs variable-length-encoded data S15 obtained by performing variable-length-encoding of the quantized data S14 to a multiplexing circuit 16. The multiplexing circuit 16 multiplexes motion-vector data S16 output from a motion compensation circuit 17 with the variable-length-encoded data S15.

An error-correcting-code generation circuit 18 adds error-correcting codes to the variable-length-encoded data S15 and the motion-vector data S16. The variable-length-encoded data S15 and the motion-vector data S16, to which the error-correcting codes have been added, are output from an output terminal 20 to the outside via a buffer circuit 19 as transmission data S17 (see FIG. 3). A recording unit, such as a CD-ROM (compact disc-read-only memory), a VCR (video cassette recorder), or the like, may be connected to the output terminal 20.

The quantized data S14 input to an inverse-quantization circuit 21 is subjected to inverse-quantization processing to be converted into inverse-quantized data S18, so that the converted data before the quantization processing is obtained by being decoded and is output to an inverse-DCT circuit 22. The inverse-DCT circuit 22 converts the inverse-quantized data S18 into decoded image data S19 by conversion processing which is inverse to that of the DCT circuit 13, and outputs the decoded image data S19 to a generation circuit 23. The generation circuit 23 adds frame-image data S11 read from the frame memory 12 to the decoded image data S19, so that the image data output as the transmission data S17 is restored and sequentially stored in the frame memory 12.

The motion compensation circuit 17 reads decoded image data S20 from the frame memory 12, and compares it with the digital image data S10. That is, the block of the preceding frame, which matches the digital image data S10, is detected, and a motion vector is calculated based on the result of the detection. The calculated motion-vector data S17 is output to the multiplexing circuit 16.

Although in the present embodiment, in order to increase the processing speed, a motion vector is detected in units of a plurality of blocks, each comprising (8×8) pixels and serving as a standard unit for encoding processing, the motion vector may also be detected in units of a block comprising (8×8) pixels.

The motion compensation circuit 17 outputs reading control data S21 to the frame memory 12 based on the result of the detection of matching. The frame memory 13 outputs predictive data S11 based on the reading control data S21.

Figure 3:
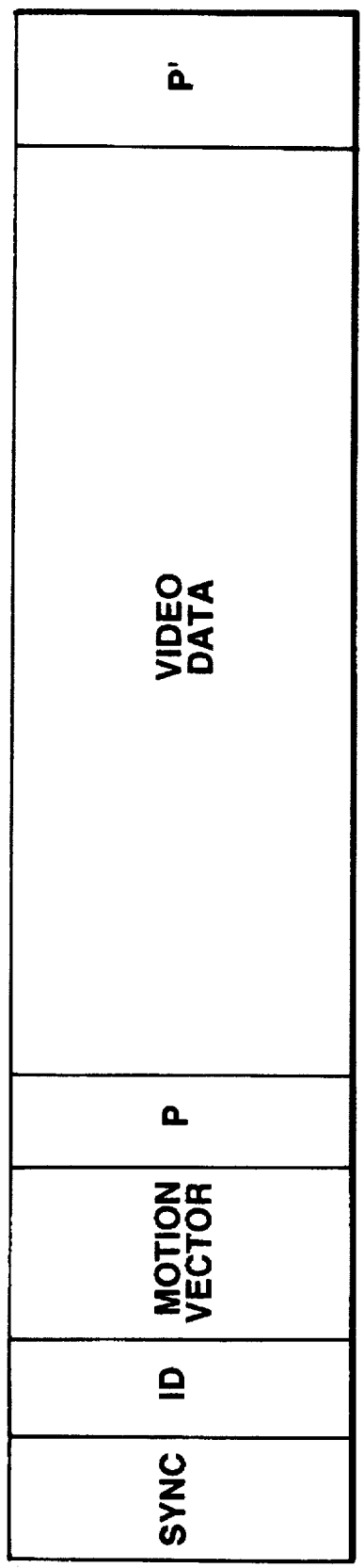
FIG. 3 is a transmission frame format of the first embodiment.

FIG. 3 illustrates a transmission frame format used in the present embodiment. In FIG. 3, ID represents an area where the number of synchronizing blocks, information relating to boundaries between variable-length-encoded data, and the like are written. P and P' represent areas where parity bits, serving as error-correcting codes for correcting error codes, are written. Errors in motion-vector data are protected in two ways by P and P'. Errors in video data are protected by P'.

According to the configuration shown in FIG. 3, it is possible to easily and assuredly recognize if errors are present in transmitted motion-vector data. Motion-vector data may be added to each group of blocks, serving as a unit for detecting motion vectors, or to each block.

Figure 2:
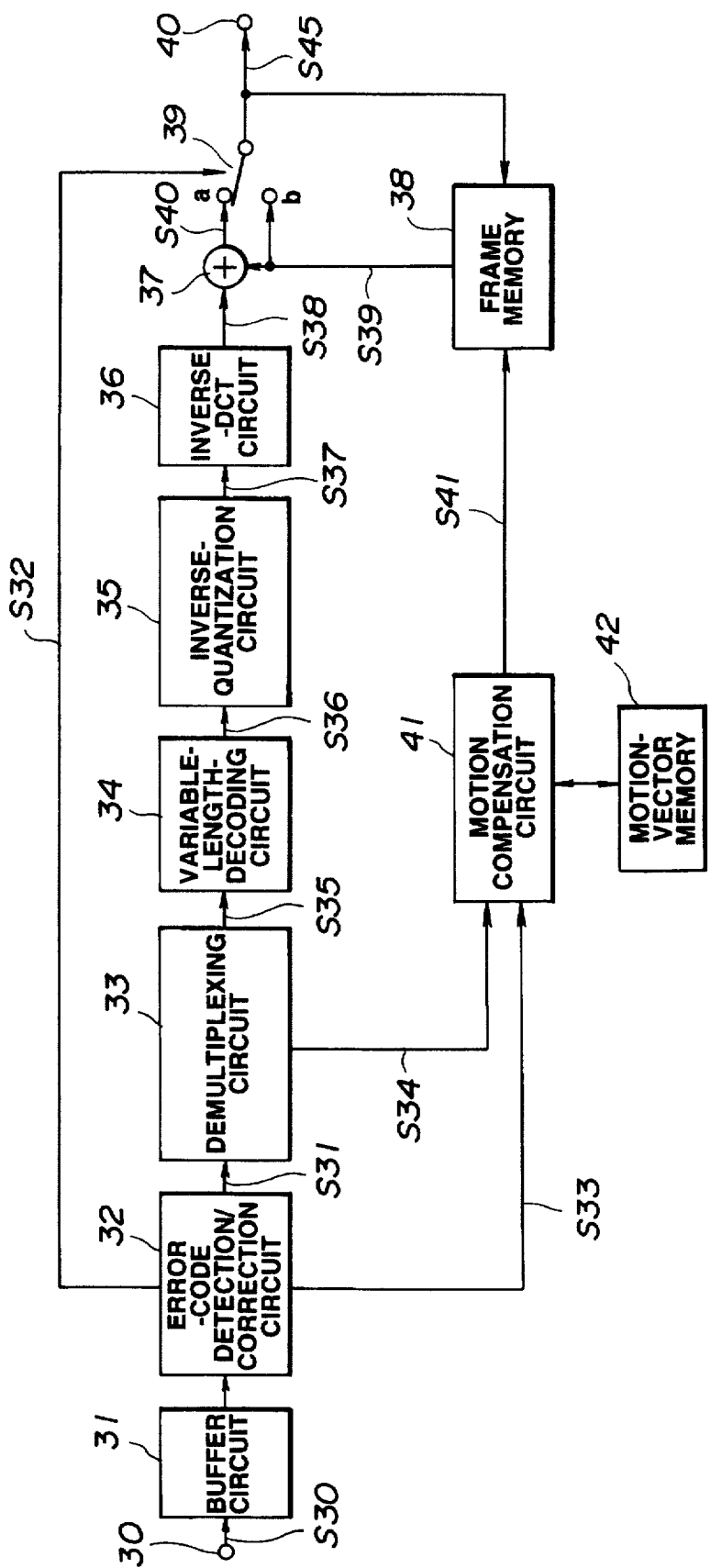
FIG. 2 is a block diagram of an image decoding apparatus according to the first embodiment.

FIG. 2 is a block diagram of a decoding apparatus for decoding encoded data subjected to motion-compensation predictive encoding in the apparatus shown in FIG. 1.

In FIG. 2, reproduced data S30, which has been read from a recording medium or the like and transmitted, is input from an input terminal 30. The input reproduced data S30 is input to an error-code detection/correction circuit 32 via a buffer circuit 31.

The error-code detection/correction circuit 32 detects and corrects errors included in image data and motion vector data of the reproduced data S30, and outputs corrected reproduced data S31 to a demultiplexing circuit 33. Upon detection of image data (in units of a block) including at least one uncorrectable error, the error-code detection/correction circuit 32 outputs a switching control signal S32 for controlling switching of output image data. Similarly, upon detection of motion-vector data including at least one uncorrectable error, the error-code detection/correction circuit 32 outputs a control signal S33 for controlling motion-vector data used for motion compensation.

The demultiplexing circuit 33 separates motion-vector data S34 from the reproduced data S31, and supplies a variable-length-decoding circuit 34 with difference image data (block data) S35. The variable-length-decoding circuit 34 decodes the difference image data S35, and outputs decoded image data S36 to an inverse-quantization circuit 35. The inverse-quantization circuit 35 converts the decoded image data S36 into inverse-quantized data S37 by performing inverse-quantization processing. An inverse-DCT circuit 36 converts the data S37 into decoded image data S38 by performing conversion processing which is inverse to that of the DCT circuit 13 shown in FIG. 1, and outputs the data S38 to a generation circuit 37.

The generation circuit 37 adds the decoded image data S38 to motion-compensation data S39, read from the frame memory 38, to obtain image data S40. A switching circuit 39 selects one of the image data S40 and the motion-compensation data S39 as reproduced image data S45 based on the switching control signal S32. The reproduced image data S45 is output to the frame memory 38 and an output terminal 40.

The switching of the switching circuit 39 is controlled by the switching control signal S32 supplied from the error-code detection/correction circuit 32. The switching control signal S32 comprises information indicating if at least one uncorrectable error is present in the difference image data S31. The switching control of the switching circuit 39 by the switching control signal S32 will be described later.

The demultiplexing circuit 33 separates the motion-vector data S34 from the reproduced data S31, and supplies the separated motion vector S34 to a motion compensation circuit 41. The motion compensation circuit 41 outputs a reading control signal S41, for controlling reading from the frame memory 38, to the frame memory 38 based on the motion-vector data S34. The motion compensation circuit 41 controls the output of the reading control signal S41 in accordance with the control signal S33.

The frame memory 38 reads stored image data based on the reading control signal S41, and outputs the read data as the motion compensation data S39.

The motion-vector data S34 is stored in a motion-vector memory 42. Only motion-vector data which include no uncorrectable error are stored in the motion-vector memory 42.

Processing by the switching control signal S32 and the control signal S33 in the present embodiment will now be described in detail. In the following description, the current block data indicates block data which is currently processed, and the current motion-vector data indicates motion-vector data which corresponds to the current block data.

(1) A case in which both the switching control signal S32 and the control signal S33 include no uncorrectable error (a case in which both image data and motion-vector data include no uncorrectable error)

The switching circuit 39 is connected to the side of terminal "a".

The motion-compensation circuit 41 outputs a reading control signal S41 using information of the current motion-vector data S34.

The frame memory 38 outputs motion compensation data S39 based on the reading control signal S41. The motion compensation data S39 read from the frame memory 38 is output to the generation circuits 37. Image data S40 output from the generation circuit 37 is output from the output terminal 40 to the outside via the switching circuit 39 as reproduced image data S45.

The motion-vector memory 42 stores the current motion-vector data S34 as the motion-vector data for the current block data S35.

(2) A case in which the switching control signal S32 includes at least one uncorrectable error code, and the control signal S33 includes no uncorrectable error code (a case in which image data includes at least one uncorrectable error code and the motion-vector data includes no uncorrectable error code)

The switching circuit 39 is connected to the side of terminal "b".

The motion compensation circuit 41 outputs a reading control signal S41 using information of the current motion-vector data S34.

The frame memory 38 outputs motion compensation data S39 based on the reading control signal S41. The motion compensation data S39 read from the frame memory 38 is output from the output terminal 40 via the switching circuit 39 as reproduced image data S45.

The motion-vector memory 42 stores the current motion-vector data S34 as motion-vector data for the current block data S35.

(3) A case in which the switching control signal S32 includes no uncorrectable error code, and the control signal S33 includes at least one uncorrectable error code (a case in which image data includes no uncorrectable error code, and motion-vector data includes at least one uncorrectable error code).

The switching circuit 39 is connected to the side of terminal "a".

The motion compensation circuit 41 neglects the current motion-vector data S34, reads motion-vector data of the immediately preceding block from the motion-vector memory 42, and outputs a reading control signal S41 based on the read data.

The frame memory 38 outputs motion compensation data S39 read based on the reading control signal S41 to the generation circuit 37.

Image data S40 output from the generation circuit 37 is output from the output terminal 40 to the outside via the switching circuit 39 as reproduced image data S45.

The motion-vector memory 42 stores, instead of the current motion-vector data S34, motion-vector data used in decoding processing (the motion-vector data of the immediately preceding block) as the motion-vector data for the current block data S35.

(4) A case in which each of the switching control signal S32 and the control signal S33 includes at least one uncorrectable error code (a case in which each of image data and motion-vector data includes at least one uncorrectable error code).

The switching circuit 39 is connected to the side of terminal "b".

The motion compensation circuit 41 forcedly makes the current motion-vector data S34, which has been input, "0", and outputs a reading control signal S41 based thereon.

The frame memory 38 outputs motion compensation data S39 based on the reading control signal S41. The motion compensation data S39 read from the frame memory 38 is output from the output terminal 40 to the outside via the switching circuit 39 as reproduced image data S45.

That is, at that time, the current block data S35 is replaced (concealed) by the block data of the preceding frame at the same position as the current block data S35.

The motion-vector memory 42 stores, instead of the current motion-vector data S34, motion-vector data used in decoding processing (the motion-vector data is made "0") as the motion-vector data of the current block data S35.

The same processing as in case (4) may be performed in case (3)

In case (4), degradation in the quality of the reproduced image can also be prevented by performing the following processing.

The switching circuit 39 is connected to the side of terminal "b".

The motion compensation circuit 41 neglects the current motion-vector data S34, reads the motion-vector data of the immediately preceding block from the motion-vector memory 42, and outputs a reading control signal S41 based on the read data.

The frame memory 38 outputs motion compensation data S39 based on the reading control signal S41. The reading compensation data S39 read from the frame memory 38 is output from the output terminal 40 to the outside via the switching circuit 39 as reproduced image data S45.

The motion-vector memory 42 stores, instead of the current motion-vector data S34, motion-vector data used in decoding processing (the motion-vector data of the immediately preceding block) as the motion-vector data of the current block data S35.

Figure 4:
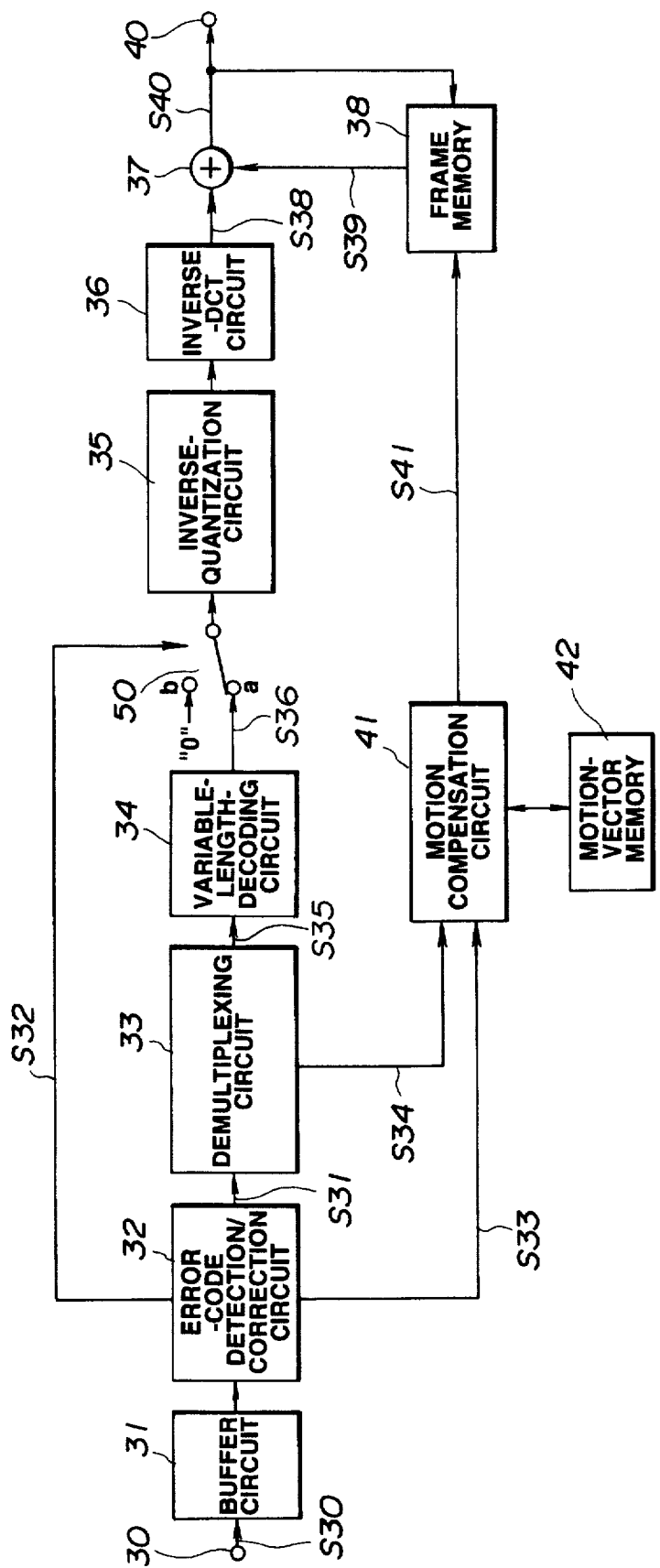
FIG. 4 is a block diagram of an image decoding apparatus according to a second embodiment of the present invention.

FIG. 4 is a block diagram of a decoding apparatus for decoding encoded data subjected to motion-compensation predictive encoding processing in the apparatus shown in FIG. 1 according to a second embodiment of the present invention. In FIG. 4, the same components as those shown in FIG. 2 are indicated by the same reference numerals, and a description thereof will be omitted.

The apparatus shown in FIG. 4 differs from the apparatus shown in FIG. 2 in that instead of the switching circuit 39, a switching circuit 50 having the equivalent function is provided. The switching of the switching circuit 50 is controlled by a switching control signal S32 supplied from the error-code detection/correction circuit 32.

Processing by the switching control signal S32 and the control signal S33 in the present embodiment will now be described in detail.

(a) A case in which both the switching control signal S32 and the control signal S33 include no uncorrectable error (a case in which both image data and motion-vector data include no uncorrectable error)

The switching circuit 50 is connected to the side of terminal "a".

The motion-compensation circuit 41 outputs a reading control signal S41 using information of the current motion-vector data S34.

The frame memory 38 outputs motion compensation data based on the reading control signal S41. The motion compensation data S39 read from the frame memory 38 is output to the generation circuit 37. Image data S40 output from the generation circuit 37 is output from the output terminal 40 to the outside.

The motion-vector memory 42 stores the current motion-vector data S34 as the motion-vector data for the current block data S35.

(b) A case in which the switching control signal S32 includes at least one uncorrectable error code, and the control signal S33 includes no uncorrectable error code (a case in which image data includes at least one uncorrectable error code and the motion-vector data includes no uncorrectable error code)

The switching circuit 50 is connected to the side of terminal "b". That is, decoded image data S36 is replaced by data indicating "0".

The motion compensation circuit 41 outputs a reading control signal S41 using information of the current motion-vector data S34.

The frame memory 38 outputs motion compensation data S39 based on the reading control signal S41. The motion compensation data S39 read from the frame memory 38 is output to the generation circuit 37. Image data S40 output from the generation circuit 37 is output from the output terminal 40 to the outside.

The motion-vector memory 42 stores the current motion-vector data S34 as motion-vector data for the current block data S35.

(c) A case in which the switching control signal S32 includes no uncorrectable error code, and the control signal S33 includes at least one uncorrectable error code (a case in which image data includes no uncorrectable error code, and motion-vector data includes at least one uncorrectable error code)

The switching circuit 50 is connected to the side of terminal "a".

The motion compensation circuit 41 neglects the current motion-vector data S34, reads motion-vector data of the immediately preceding block from the motion-vector memory 42, and outputs a reading control signal S41 based on the read data.

The frame memory 88 outputs motion compensation data S89 read based on the reading control signal S41 to the generation circuit 37.

Image data S40 output from the generation circuit 87 is output from the output terminal 40 to the outside.

The motion-vector memory 42 stores, instead of the current motion-vector data S84, motion-vector data used in decoding processing (the motion-vector data of the immediately preceding block) as the motion-vector data for the current block data S35.

(d) A case in which each of the switching control signal S82 and the control signal S88 includes at least one uncorrectable error code (a case in which each of image data and motion-vector data includes at least one uncorrectable error code)

The switching circuit 80 is connected to the side of terminal "b". That is, decoded image data S88 is replaced by data indicating "0".

The motion compensation circuit 41 forcedly makes the current motion-vector data S84, which has been input, "0", and outputs a reading control signal S41 based thereon.

The frame memory 88 outputs motion compensation data S89 read based on the reading control signal S41 to the generation circuit 37. Image data S40 output from the generation circuit 37 is output from the output terminal 40 to the outside.

That is, at that time, the current decoded image data S36 is replaced by block data of the preceding frame at the same position as the current decoded image data S36.

The motion-vector memory 42 stores, instead of the current motion-vector data S34, motion-vector data used in decoding processing (the motion-vector data is made "0") as the motion-vector data of the current block data S35.

The same processing as in case (d) may be performed in case (c).

In case (d), degradation in the quality of the reproduced image can also be prevented by performing the following processing.

The switching circuit 50 is connected to the side of terminal "b". That is, decoded image data S36 is replaced (concealed) by data indicating "0".

The motion compensation circuit 41 neglects the current motion-vector data S34, reads the motion-vector data of the immediately preceding block from the motion-vector memory 42, and outputs a reading control signal S41 based on the read data.

The frame memory 38 outputs motion compensation data S39 read based on the reading control signal S41 to the generation circuit 37. Image data S40 output from the generation circuit 37 is output from the output terminal 40 to the outside.

The motion-vector memory 42 stores, instead of the current motion-vector data S34, motion-vector data used in decoding processing (the motion-vector data of the immediately preceding block) as the motion-vector data of the current block data S35.

As can be easily understood from the foregoing explanation, according to the above-described embodiments, when at least one uncorrectable error is produced in image data and/or motion-vector data, decoding processing is switched in accordance with the combination of the occurrence of errors (the above-described cases (1)–(4), and (a)–(d)). Hence, it is possible to generate a reproduced image having little degradation in the picture quality even in the case of a moving image.

The present invention may be executed in various other forms without departing from the spirit and main features thereof.

For example, although in the above-described embodiments a description has been made illustrating interframe predictive encoding, the same effects may be obtained by performing the similar processing in interfield predictive encoding.

Although in the above-described embodiments, when at least one uncorrectable error is present in block data, the block data of the preceding frame is used as data for concealment, the block data of the succeeding frame may also be used as data for concealment.

Although in the above-described embodiments, when at least one uncorrectable error is present in motion-vector data, that data is replaced by the motion-vector data of the preceding block, that data may be replaced by the motion-vector data of the succeeding block.

In other words, the foregoing description of the embodiments has been given for illustrative purposes only and is not to be construed as imposing any limitation in every respect.

The scope of the invention is, therefore, to be determined solely by the following claims and not limited by the text of the specification, and alterations made within a scope equivalent to the scope of the claims fall within the true spirit and scope of the invention.

The individual components shown in outline or designated by blocks in the drawings are all well known in the image processing apparatus arts and their specific construction and operation are not critical to the operation or best mode for carrying out the invention.

What is claimed is:

1. An image processing apparatus comprising:
    input means for inputting information data including motion data and image data encoded in accordance with the motion data, the motion data being detected in units of pixels;
    detection means for detecting error codes in the image data and the motion data; and
    concealment means for concealing the image data by replacing it by image data of an adjacent picture frame extracted using the motion data, said concealment means concealing the motion data into the motion data of an adjacent block in accordance with an output from said detection means.

2. An image processing apparatus according to claim 1, wherein the information data further includes error-detecting/correcting check codes for detecting and correcting error codes in the motion data and the image data, and wherein said detection means detects whether the image data includes an uncorrectable error code using the error-detecting/correcting check code.

3. An image processing apparatus according to claim 1, wherein the image data comprises data encoded in units of a block of pixels.

4. An image processing apparatus according to claim 3, wherein said concealment means conceals block data including at least one error code into block data of an adjacent picture frame extracted based on the motion data of the block data.

5. An image processing apparatus according to claim 3, wherein the motion data is detected in units of a plurality of blocks.

6. An image processing apparatus according to claim 5, wherein the motion data comprises motion-vector data.

7. An image processing apparatus comprising:
    input means for inputting information data including motion data and image data encoded in accordance with the motion data, the information data including error-detecting/correcting check codes for detecting and correcting error codes in the motion data and the image data;
    predictive-image generation means for generating predictive image data based on the motion data;
    synthesis means for synthesizing the predictive image data with the image data;
    detection means for detecting error codes in the image data, said detecting means detecting whether the image data includes an uncorrectable error code using the error-detecting/correcting check codes; and
    replacement means for replacing the image data input to said synthesis means by a predetermined value in accordance with an output from said detection means.

8. An image processing apparatus according to claim 7, wherein the image data comprises data encoded in units of a block of pixels.

9. An image processing apparatus according to claim 8, wherein the motion data is detected in units of a plurality of blocks.

10. An image processing apparatus according to claim 9, wherein the motion data comprises motion-vector data.

11. An image processing apparatus according to claim 9, wherein said detection means further detects errors in the motion data, and wherein said predictive-image detection means generates the predictive image data based on motion data of an adjacent block in accordance with an output from said detection means.

12. An image processing apparatus comprising:
    input means for inputting information data including motion data and image data encoded in accordance with the motion data;
    detection means for detecting error codes in the motion data and the encoded data; and
    decoding means for decoding the image data in accordance with an output from said detection means.

13. An image processing apparatus according to claim 12, wherein, when at least one error is present in the motion data, said decoding means conceals the image data into image data of an adjacent picture frame.

14. An image processing apparatus according to claim 12, wherein, when at least one error is present in the image data, said decoding means conceals the image data into image data extracted from image data of an adjacent picture frame based on the motion data.

15. An image processing apparatus according to claim 12, wherein the information data further includes error-detecting/correcting codes for detecting and correcting error codes in the motion data and the image data, and wherein said detection means detects uncorrectable error codes using the error-detecting/correcting codes.

16. An image processing apparatus according to claim 12, wherein the image data comprises data encoded in units of a block of pixels.

17. An image processing apparatus according to claim 16, wherein, when at least one error is present in the motion data, said decoding means decodes the image data while replacing the motion data by motion data of another block.

18. An image processing method comprising the steps of:
    inputting information data including motion data and image data encoded in accordance with the motion data, the motion data being detected in units of pixels;
    detecting error codes in the image data and the motion data; and
    concealing the image data by replacing it by image data of an adjacent picture frame extracted using the motion data, the motion data being concealed into the motion data of an adjacent block in accordance with the detected error codes.

19. An image processing method comprising the steps of:
    inputting information data including motion data and image data encoded in accordance with the motion data, the information data including error-detecting/ correcting check codes for detecting and correcting error codes in the motion data and the image data;

generating predicted image data based on the motion data;

synthesizing the predictive image data with the image data;

detecting error codes in the image data, said detecting step detecting whether the image data includes an uncorrectable error code using the error-detecting/correcting check codes; and replacing the image data input to the synthesizing step by a predetermined value in accordance with the detection result.

20. An image processing method comprising the steps of:

inputting information data including motion data and image encoded in accordance with the motion data;

detecting error codes in the motion data and the encoded data; and decoding the image data in accordance with an output from the detection step.

* * * * *

UNITED STATES PATENT AND TRADEMARK OFFICE
CERTIFICATE OF CORRECTION

PATENT NO. : 5,614,958
DATED : March 25, 1997
INVENTOR(S) : AKIHIRO SHIKAKURA

It is certified that error appears in the above-identified patent and that said Letters Patent is hereby corrected as shown below:

COLUMN 7:

Line 55, "memory 88" should read --memory 38--.
    Line 56, "S89" should read --S39--.
    Line 58, "circuit 87" should read --circuit 37--.
    Line 61, "data S84," should read --data S34,--.
    Line 66, "S82" should read S32--; and "S88" should read --S33--.

COLUMN 8:

Line 4, "80" should read --50--.
    Line 5, "S88" should read --S36--.
    Line 8, "S84," should read --S34,--.
    Line 10, "88" should read --38--.
    Line 11, "S89" should read --S39--.

UNITED STATES PATENT AND TRADEMARK OFFICE
CERTIFICATE OF CORRECTION

PATENT NO. : 5,614,958
DATED : March 25, 1997
INVENTOR(S) : AKIHIRO SHIKAKURA

It is certified that error appears in the above-identified patent and that said Letters Patent is hereby corrected as shown below:

<u>COLUMN 12</u>:

Line 3, "image" should read --image data--.

Signed and Sealed this

Seventh Day of October, 1997

Attest:

BRUCE LEHMAN

*Attesting Officer*    *Commissioner of Patents and Trademarks*